D. Treadwell,
Making Cannon.
No 3906.  Patented Feb 12, 1845.
Fig: 1.
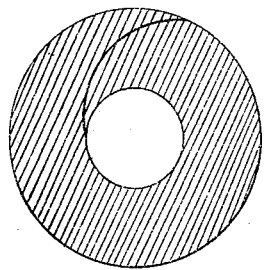
Fig: 2.
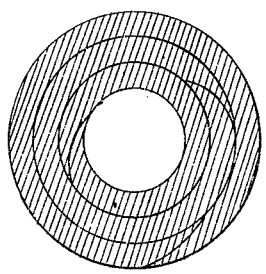
Fig: 3.
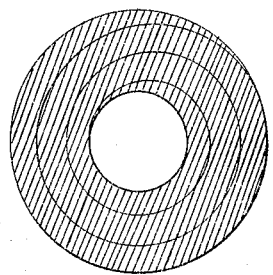
Fig: 4.
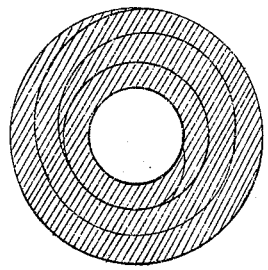
Fig: 5.
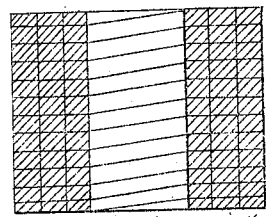
This figure is referred to in the specification as an end view. It should have been called a longitudinal section.
Fig: 6.
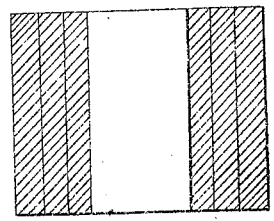
Fig: 7.
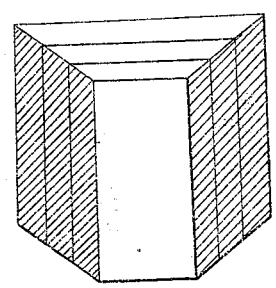
Fig: 8.
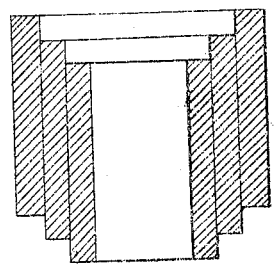
Witnesses.
J. F. Dana
Edward Brown Jr.
Inventor:
Dan¹ Treadwell

UNITED STATES PATENT OFFICE.

DANIEL TREADWELL, OF CAMBRIDGE, MASSACHUSETTS.

METHOD OF MAKING CANNON OF WROUGHT-IRON OR WROUGHT-IRON AND STEEL.

Specification of Letters Patent No. 3,906, dated February 12, 1845.

*To all whom it may concern:*

Be it known that I, DANIEL TREADWELL, of Cambridge, in the county of Middlesex and State of Massachusetts, engineer, have invented a new and useful Engine or Machine, being an Improved Cannon, of which the following is an exact description.

This improved cannon is formed of a series of rings, or short hollow cylinders, of wrought iron, or steel, or of wrought iron and steel combined, which rings are joined together by their ends in sufficient number to make the length required for the whole cannon. Each ring or cylinder is formed by winding or turning a piece of iron of the thickness required for the walls of the cannon, around a mandrel and welding its ends together by a scarfed joint; or, 2d, several rings may be formed of thin iron and of different sizes, so that one shall slip over the outside of another until a sufficient thickness for the cannon shall be attained, when by welding these several rings together, a single ring is obtained; or, 3d, long bars of iron or steel of a width equal to the length of a ring, the ends being scarfed down, may be wound over a mandrel or spindle, in the manner that pieces of ribbon are wound upon a block. These spirals being welded together form a complete ring or hollow cylinder. Or, 4th, long and narrow bars may be wound upon a mandrel, side by side, and upon the top of each other, until sufficient length and thickness be attained for a ring, and these turns being welded together the ring is formed.

In the drawing hereto annexed Figure 1 shows an end view of a ring made in the manner first described; Fig. 2 a ring in the manner second described; Fig. 3 a ring in the manner third described; Fig. 4 a ring wound spirally upon an inner ring, being a combination of the first and third; Fig. 5 a ring after the manner fourth described.

The rings or hollow cylinders being formed by any of the foregoing methods, or any combination of them, and of different thicknesses, as required to give the proper shape to the cannon, and of any convenient lengths, may have their ends formed square as shown at Fig. 6, or conical so that the solid cone of one many enter the hollow cone of another, as shown at Fig. 7, or into cylinders of different sizes, so that one shall pass over another, as shown at Fig. 8. They are next to be heated and placed end to end and welded together, and thus a hollow frustum of a cone is formed of the length required for the cannon. The trunnions are to be welded upon the sides of the cannon either before the full length is made out, or when it is completed, or they are welded upon a separate ring or band larger than the cannon and secured to the same by a screw, the thread of which is cut upon the outside of the cannon, to fit a corresponding thread cut upon the inside of the ring. The breech pin may be screwed into the cannon after the cannon is bored and turned, or it may be welded in previously to finishing the cannon.

What I claim as my invention in the foregoing specification is this, viz:

I have invented a new and improved kind of cannon, which is formed of a series of rings, or short hollow cylinders joined together by their ends, in sufficient number to form the length required for the cannon; and for this I claim Letters Patent.

In testimony whereof I, the said DANIEL TREADWELL, hereto subscribe my name in the presence of the witnesses whose names are hereto subscribed on the 26th day of July, A. D. eighteen hundred and forty four.

DANL. TREADWELL.

Signed in our presence:
WILLARD PHILLIPS,
MILTON WASON.